M. D. TILLMAN.
SHOCK ABSORBER.
APPLICATION FILED AUG. 30, 1911.

1,087,898.

Patented Feb. 17, 1914.

Witnesses
Frank A. Fahle
S. J. Carter

Inventor
Marshal D. Tillman,
By
Arthur M. Hood
Attorney

UNITED STATES PATENT OFFICE.

MARSHAL D. TILLMAN, OF WABASH, INDIANA.

SHOCK-ABSORBER.

1,087,898.   Specification of Letters Patent.   Patented Feb. 17, 1914.

Application filed August 30, 1911. Serial No. 646,837.

*To all whom it may concern:*

Be it known that I, MARSHAL D. TILLMAN, a citizen of the United States, residing at Wabash, in the county of Wabash and State of Indiana, have invented a new and useful Shock-Absorber, of which the following is a specification.

In the operation of ordinary shock absorbers, it is found that if provision is made for taking the shocks of rough roads there is not sufficient yielding for easy riding on smooth roads, while if the desired yielding is provided for on smooth roads the shocks produced by rough roads are not sufficiently taken care of.

It is the object of my present invention to provide a shock absorber which will allow the sufficient yielding for easy riding on smooth roads and yet provide sufficient protection against the shocks occasioned by rough roads. In attaining this object, there is provided a resilient device which in the ordinary operation of a vehicle on smooth roads is inoperative, but which becomes operative when excessive shocks are produced. This effect is obtained by providing a lost motion connection for the resilient device, the lost motion permitting a predetermined movement in each direction, but especially a spreading movement, between the parts of the vehicle before the resiliency of the device is called into play.

The various novel features of my invention will appear from the description and drawings and will be particularly pointed out in the claims.

Figure 1:
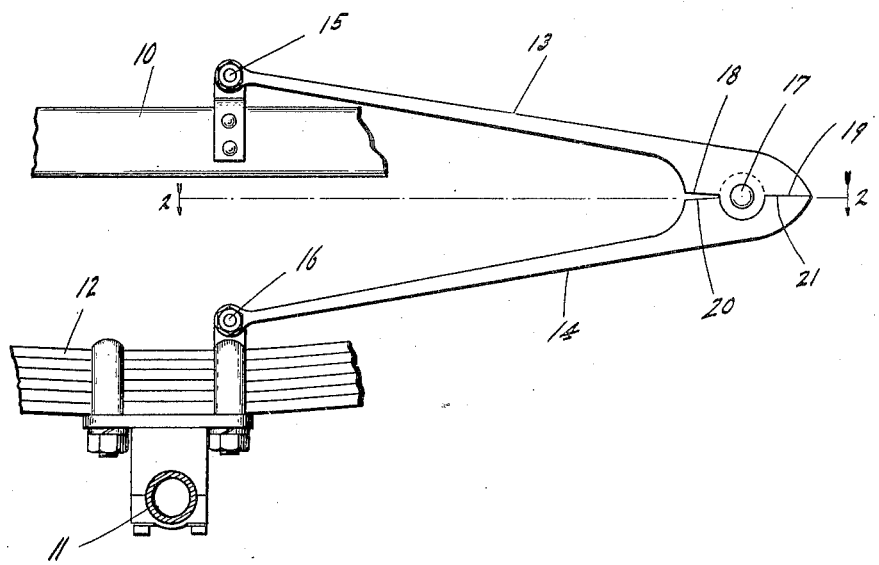
Figure 2:
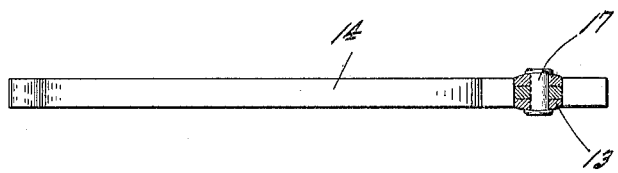

In the accompanying drawings, which illustrate a preferred form of my invention, Figure 1 shows a fragment of a vehicle with my shock absorber attached; and Fig. 2 a section on the line 2—2 of Fig. 1.

The body 10 of the vehicle is supported from the axle 11 by the usual springs 12. In addition, two spring arms 13 and 14 are pivoted at 15 and 16 to the body 10 and axle 11, or parts rigidly connected thereto, respectively. The arms 13 and 14 are pivoted together at 17. Adjacent to the pivot 17 on the arm 13 are two shoulders 18 and 19, which coöperate with two similar shoulders 20 and 21 on the arm 14. The shoulders 18, 19, 20, and 21 are so located relatively to each other that a limited amount of relative movement between the arms 13 and 14, both toward and away from each other, is permitted on the pivot 17, the entire permissible movement being shown in Fig. 1 between the shoulders 18 and 20.

When the vehicle is running on smooth roads, a slight movement of the body part 10 is freely permitted by the shock absorber, the arms 13 and 14 swinging freely relatively to each other about the pivot 17 by reason of the lost motion between the shoulders 18 and 20. Should a rougher road be encountered, or if for any reason the lost motion between the arms 13 and 14 in either direction is taken up, opposite shoulders on the two spring arms are brought together and further shock is absorbed by the bending of such arms. The shock due to the movement toward each other of the parts 10 and 11 is absorbed by the inward bending of the arms 13 and 14 after the shoulders 18 and 20 have engaged, and that due to the movement away from each other of such parts 10 and 11 is absorbed by the outward bending of the arms 13 and 14 after the shoulders 19 and 21 have engaged. This latter part of the shock, due to the rebound after an obstruction is struck, is the one which ordinarily causes the greatest trouble, and is fully taken care of by my device. In fact, in some instances it is not necessary to make provision for the first part of the shock, or that due to movement toward each other of the parts 10 and 11; in which case the shoulders 18 and 20 may be omitted. The lost motion permitted before the shock absorber is called into play may be anything desired, the distance between the shoulders 18 and 20, with the shoulders 19 and 21 in engagement, being varied as required.

As many of my shock absorbers may be used on a vehicle as required, and though only one shock absorber is shown it is deemed preferable to have at least one at each end of each axle.

My invention is not limited to the precise arrangement shown, and I aim to cover all modifications which do not involve a departure from the spirit and scope of my invention as set forth in the following claims.

What I claim as new is:—

1. A shock absorber, comprising two spring arms pivotally connected together and arranged for pivotal connection to two relatively movable parts of a vehicle, the two arms being provided with shoulders which engage each other to permit but a limited amount of relative movement in each direction of the arms about the pivot connecting them.

2. A shock absorber, comprising two spring arms pivotally connected together at one end and arranged for connection at the other to two relatively movable parts of a vehicle, each arm having a shoulder which engages a corresponding shoulder on the other arm upon a limited amount of relative movement in each direction between such two parts.

3. A shock absorber, comprising two relatively movable parts and a two-part resilient device connecting them, the two parts of said resilient device themselves providing the resiliency and being connected by a lost motion device which permits a certain amount of movement in each direction between the two parts of the resilient device before the resiliency of the connection is called into play.

4. A shock absorber, comprising two spring arms pivotally connected together and arranged for pivotal connection to two relatively movable parts of a vehicle, the two arms being provided with shoulders which engage each other to permit but a limited amount of relative spreading movement of the arms about the pivot connecting them.

5. A shock absorber, comprising two spring arms pivotally connected together at one end and arranged for connection at the other to two relatively movable parts of a vehicle, each arm having a shoulder which abuts against a corresponding shoulder on the other arm upon a limited amount of relative spreading movement between such two parts.

6. A shock absorber, comprising two relatively movable parts and a two-part resilient device connecting them, the two parts of said resilient device themselves providing the resiliency and being connected by a lost motion device which permits a certain amount of spreading movement between the two parts of the resilient device before the resiliency of the connection is called into play.

7. A shock absorber comprising a pair of transversely resilient arms, each having an enlarged head; means for connecting the free end of one arm with a vehicle spring; means for connecting the free end of the other arm with a support; and a pivot element uniting the intermediate portions of the heads, the end faces of the heads being normally spaced apart, upon both sides of the pivot element, thereby to permit the vehicle spring to yield without bringing the end faces together and without putting the spring arms under tension; the end faces being adapted to engage, upon either side of the pivot element, upon an undue yielding of the vehicle spring, thus putting the spring arms under tension both when the vehicle spring is compressed, and when it is released.

In witness whereof, I, have hereunto set my hand and seal at Wabash, Indiana, this 26 day of August, A. D. one thousand nine hundred and eleven.

MARSHAL D. TILLMAN. [L. S.]

Witnesses:
W. E. CHANDLER,
CHARLEY RETHERFORD.

---

Copies of this patent may be obtained for five cents each, by addressing the "Commissioner of Patents, Washington, D. C."